UNITED STATES PATENT OFFICE.

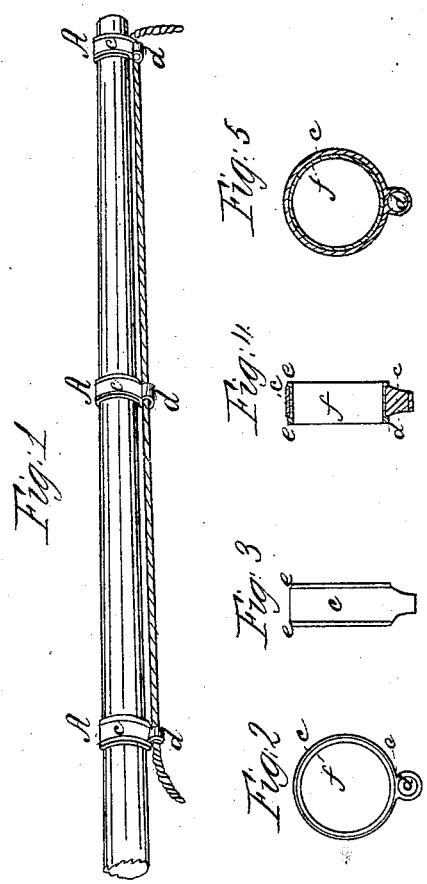

HENRY PRITCHARD, OF BROOKLYN, NEW YORK.

IMPROVEMENT IN GUIDE-RINGS FOR FISHING-RODS.

Specification forming part of Letters Patent No. 25,693, dated October 4, 1859.

*To all whom it may concern:*

Be it known that I, HENRY PRITCHARD, of the city of Brooklyn, county of Kings, and State of New York, have invented a new and Improved Fish-Pole Guide; and I do hereby declare that the following is a full and exact description thereof, reference being had to the accompanying drawings, and to the letters of reference marked thereon.

The nature of my invention consists in combining a movable thimble (having the eye permanently attached thereto) with a ferrule securely fastened to the fish-pole in such a manner as to allow the thimble to turn freely on the ferrule, thereby adjusting the eyes on the thimbles to one and the same line in case the pole should get warped or twisted.

Figure 1 represents a portion of a fish-pole with three of the guides A A A attached thereto. Fig. 2 represents a front view of the guide detached from the rod. Fig. 3 represents a side view of the same. Fig. 4 is a longitudinal section of the guide. Fig. 5 is a cross-section of the guide.

In all the drawings the same letters refer to like parts.

The guides may be made of any suitable material, such as brass, silver, &c., and should be constructed as follows, viz: The ferrule $f$ should be of the same diameter as the rod or pole to which it is to be attached, and should have a flange, $e'$, turned up at one end, so as to keep the thimble $c$ secure in its position. The thimble should be sufficiently large to turn freely on the ferrule. The eye $d$ is formed on or out of a portion of the thimble.

The ferrule is made long enough to project through the thimble to receive a small ring, $e$, which forms the other flange, and which is soldered to the ferrule after the thimble is put on.

It is obvious that the ferrule may be put onto the pole in any position, or the pole may be twisted without occasioning any difficulty in adjusting the eye for the line to run through.

What I claim as my invention, and desire to secure by Letters Patent, is—

The combination of the fixed ferrule $f$ and the movable thimble $c$, with its eye $d$, constructed substantially as described, for the purpose set forth.

Dated this 14th day of September, 1859.

HENRY PRITCHARD.

Witnesses:
 THOS. PRICHARD,
 JAS. G. MORGAN.